May 5, 1942.   M. E. HANSEN   2,281,976
METHOD OF SPLICING RUBBER
Filed Feb. 1, 1940
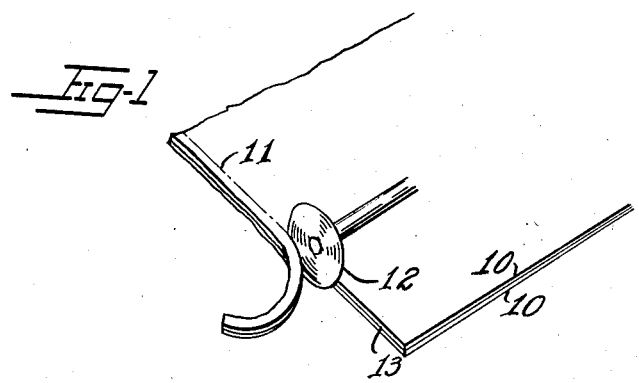
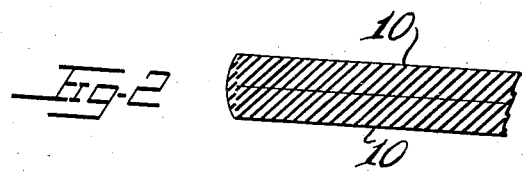
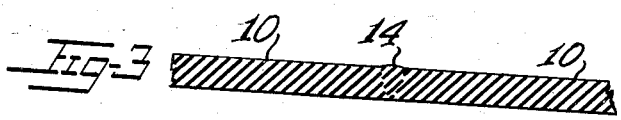
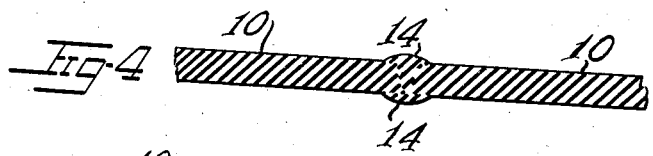
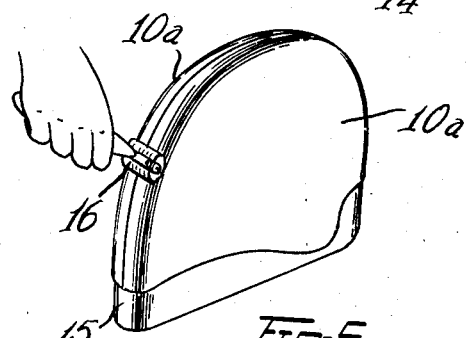
Inventor
Merrill E. Hansen
By Willis F. Avery
Atty.

Patented May 5, 1942

2,281,976

UNITED STATES PATENT OFFICE 2,281,976

METHOD OF SPLICING RUBBER

Merrill E. Hansen, Akron, Ohio, assignor to American Anode Inc., Akron, Ohio, a corporation of Delaware Application February 1, 1940, Serial No. 316,774

4 Claims. (Cl. 154—42)

This invention relates to a method of joining or splicing rubber sheets, and particularly to the splicing of latex rubber sheets, in the manufacture, for example, of rubber articles.

The manufacture of rubber articles from sheet rubber oftentimes necessitates the joining of two or more edges of the sheet rubber in a seam or seams. With unvulcanized solid milled rubber, little difficulty is experienced as it is relatively easy to force the edges together in a butt joint and then vulcanize the rubber. This forms a strongly adherent joint and ordinarily requires the use of no other adhesive material as the solid milled rubber has enough plastic flow and is adherent enough to furnish its own adhesive surfaces. Making a butt joint with latex sheet rubber by using this method is extremely difficult, however, due to the lack of plastic flow in the latex sheet rubber. Latex sheet rubber is also much less tacky than ordinary masticated solid crude rubber. It is, of course, possible to make a lap joint by using rubber cement as the adhesive or by using rubber cement with a reinforcing strip of rubber over a butt joint, but these expedients are unsatisfactory for several reasons. One bad effect is that these joints do not exhibit the same percentage elongation under load as does the main body of the rubber, and in addition the joint is bulky and quite conspicuous.

I have discovered a method whereby two latex rubber sheets, either in a vulcanized or an unvulcanized condition, may be spliced together in a butt joint that is tenacious, inconspicuous, and possesses the same percentage elongation under load as the main body of the latex rubber sheet. This new method of forming butt joints with latex sheet rubber will be described in conjunction with the accompanying drawing, in which—

Fig. 1 is a perspective elevation illustrating the two sheets of latex sheet rubber that are to be joined being cut along a straight edge.

Figs. 2 and 3 are cross-sectional semi-diagrammatic views illustrating succeeding steps in the method of joining rubber sheets.

Fig. 4 is a cross-sectional semi-diagrammatic view of the sheets of latex rubber with the splice completed.

Fig. 5 is a perspective elevation illustrating the rolling of a curved seam of a bathing cap that has been placed over a curved mandrel.

According to the method of my invention I lay together the two sheets of latex rubber 10, 10 that are to be spliced, or two edges of the same sheet, and cut them along a line 11 as with a circular knife 12. This results in a slight adhesion along the corners of the edges where the two sheets contact such adhesion apparently being caused by the pressure applied by the circular knife along the narrow area adjacent the cut. This adhesion, slight though it is, is sufficient to permit handling of the sheets and to keep them in line. Over the freshly cut edge 13 an aqueous dispersion of rubber, such as latex, or other suitable liquid rubber composition, is then spread, dried, and the two pieces of rubber are opened and the joined edge is flattened out so that the two sheets are in line (Fig. 3). The spliced region is pressed down, as by rolling with a roller, in order to make a more intimate contact between the two coated edges of the latex sheet rubber. The coated joint may then be dried and vulcanized to form a splice that is tenacious and inconspicuous. In making an article having a curved seam, such as a bathing cap, the sheets of latex rubber, such as the sheets 10a, 10a, are placed together and cut along a desired curve, such as the curve defining the outer or closed peripheral portion of a bathing cap. The exposed cut edges may then be coated with latex, as hereinabove described, and the article placed over a curved mandrel 15 having substantially the same curvature as the proposed seam. The rolling down is then done over the flat curved surface of the mandrel (Fig. 5) as with a hand roller 16. In making either a straight seam or a curved seam the operations are generally the same. For providing added strength to the splice in either case, a thin stripe of latex or other aqueous dispersion of rubber may be applied to one or both sides 14, 14 of the splice and this further dried and vulcanized to produce an exceptionally strong splice (Fig. 4). Such final application of latex stripes to the butt joint is not essential to the invention, however, and quite satisfactory joints for many purposes may be made without such strengthening.

The excellent results obtained in joining sheets of latex rubber by the method of this invention are due to the fact that the contiguous corners of the freshly-cut sheets adhere and form a hinge which permits handling of the thin sheets. This hinge apparently is formed by the pressure exerted by the knife blade on the very small area under the knife edge as it passes along the rubber sheet, which pressure is, of course, quite considerable due to the small area upon which it is exerted. This hinge holds the sheets of latex rubber together and permits the spreading of the latex, or similar adhesive, over the freshly cut edges and the opening of the sheets outward to form the butt joint. Without the formation of the hinge at the contiguous corners it would be very difficult if not impossible to butt seam thin sheets of latex rubber in a satisfactory manner.

A variety of adhesive compositions which dry to a tacky surface may be used in this invention although an aqueous dispersion of rubber is preferred. The aqueous dispersion of rubber that is employed may be any naturally occurring or artificially prepared flowable dispersion of rubber and analogous natural or synthetic gums and resins in aqueous vehicles. Such aqueous dispersions should preferably, but not necessarily, contain stabilizing, vulcanizing, and other compounding agents. They may be thickened, concentrated, or otherwise conditioned for use according to any of the well known practices.

This invention may be employed in joining two sheets of milled vulcanized or unvulcanized rubber, two sheets of vulcanized or unvulcanized latex rubber, or one sheet of vulcanized or unvulcanized latex rubber with one sheet of vulcanized or unvulcanized milled rubber in either a straight or curved seam. The invention is applicable to the manufacture of bathing caps, shower caps, baby pants, seamed rubber sheeting, and similar articles requiring either straight or curved seams. It is my intention to protect my invention broadly as limited only by the spirit and scope of the appended claims.

I claim:

1. The method of splicing rubber sheets which comprises placing the sheets to be spliced in a superposed relationship, so cutting the superposed sheets along a line to form a lightly adherent joint along the contiguous corners of the cut edges, coating the edges of the two sheets exposed by the cutting with a thin layer of an adhesive composition, opening the sheets out, and applying pressure to the sheets in the region adjacent the splice.

2. The method of splicing rubber sheets which comprises placing the sheets to be spliced in a superposed relationship, so cutting the superposed sheets along a line to form a lightly adherent joint along the contiguous corners of the cut edges, coating the edges of the two sheets exposed by the cutting with a thin layer of a liquid rubber composition, drying the rubber composition, opening the sheets outward so that at least the portions adjacent the seam lie in substantially the same plane, applying pressure to the sheets in the region adjacent the splice, applying a stripe of liquid rubber composition over the splice, and drying the liquid rubber composition.

3. The method of splicing vulcanized latex rubber sheets which comprises placing the sheets to be spliced in a superposed relationship, so cutting the sheets along a line to form a lightly adherent joint along the contiguous corners of the cut edges, coating the edges of the two sheets exposed by the cutting with a thin layer of latex, drying the latex, opening the sheets outward, applying pressure to the sheets in the region adjacent the splice, applying a stripe of latex over the splice, and drying and vulcanizing the latex.

4. The method of splicing two latex rubber sheet members which comprises placing the sheet members to be spliced in superposed relationship, so cutting the superposed sheet members along a line as to form a lightly adherent hinge-like joint along the contiguous corners of the cut edges, coating the cut edges of the two sheet members exposed by the cutting with a thin layer of latex, opening the sheets out in a hinge-like fashion until the coated cut edges are brought into abutting relationship, and applying pressure to the assembly in the region adjacent the splice.

MERRILL E. HANSEN.